(12) United States Patent
Breuer et al.

(10) Patent No.: US 11,818,494 B2
(45) Date of Patent: Nov. 14, 2023

(54) AUTOMOBILE CAMERA COMPRISING RAW IMAGE SIGNAL INTERFACE

(71) Applicant: Conti Temic microelectronic GmbH, Nuremberg (DE)

(72) Inventors: Karsten Breuer, Oberreute (DE); Alexander Brandhuber, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 17/021,829

(22) Filed: Sep. 15, 2020

(65) Prior Publication Data

US 2020/0413000 A1 Dec. 31, 2020

Related U.S. Application Data

(63) Continuation of application No. PCT/DE2019/200022, filed on Mar. 13, 2019.

(30) Foreign Application Priority Data

Mar. 15, 2018 (DE) ..................... 10 2018 203 969.0

(51) Int. Cl.
*H04N 5/77* (2006.01)
*H04N 5/38* (2006.01)

(52) U.S. Cl.
CPC .................. *H04N 5/77* (2013.01); *H04N 5/38* (2013.01)

(58) Field of Classification Search
CPC ............. H04N 21/234; H04N 21/2365; H04N 21/41422; H04N 5/77; H04N 5/38; H04N 5/765; H04N 5/2257; H04N 23/12; H04N 23/40
USPC .................................................. 348/148, 143
See application file for complete search history.

(56) References Cited

U.S. PATENT DOCUMENTS

| 6,895,256 B2 | 5/2005 | Haermae et al. |
| 2008/0043133 A1 | 2/2008 | Sasaki et al. |
| 2009/0115853 A1 | 5/2009 | Umeyama |
| 2009/0141146 A1 | 6/2009 | Guidash |
| 2010/0111489 A1 | 5/2010 | Presler |
| 2011/0205382 A1* | 8/2011 | Kanaris .................. H04N 19/60 348/222.1 |
| 2012/0062743 A1 | 3/2012 | Lynam et al. |

(Continued)

FOREIGN PATENT DOCUMENTS

| DE | 102014013446 A1 | 3/2015 |
| JP | 2015195571 A | 11/2015 |

(Continued)

OTHER PUBLICATIONS

International Search Report and Written Opinion dated Jun. 25, 2019 from corresponding International Patent Application No. PCT/DE2019/200022.

(Continued)

*Primary Examiner* — Sherrie Hsia

(57) ABSTRACT

A camera device includes an image sensor, an integrated processor, and an output interface. The camera device also includes a splitter which reads in raw image signals from the image sensor and then provides this data to both the integrated processor and to the output interface for transmission to an external processor. The integrated processor is configured to determine first object data by processing the raw image signals provided.

13 Claims, 7 Drawing Sheets

(56) References Cited

U.S. PATENT DOCUMENTS

| | | | |
|---|---|---|---|
| 2013/0201316 A1* | 8/2013 | Binder | H04L 67/12 |
| | | | 348/77 |
| 2014/0247355 A1 | 9/2014 | Ihlenburg | |
| 2015/0078725 A1 | 3/2015 | Kobuse | |
| 2015/0281573 A1 | 10/2015 | Sasaki | |
| 2016/0219193 A1 | 7/2016 | Price et al. | |
| 2016/0381338 A1* | 12/2016 | Liu | H04N 19/436 |
| | | | 348/231.99 |
| 2017/0078687 A1* | 3/2017 | Coward | H04N 19/395 |
| 2018/0091866 A1 | 3/2018 | Sun et al. | |
| 2018/0302551 A1 | 10/2018 | Yamajo | |
| 2019/0208181 A1* | 7/2019 | Rowell | H04N 5/23238 |
| 2019/0244334 A1 | 8/2019 | Arakawa | |
| 2019/0387197 A1* | 12/2019 | Balcioglu | H04N 21/234 |
| 2020/0120327 A1* | 4/2020 | Presler | H04N 5/225 |
| 2020/0413000 A1* | 12/2020 | Breuer | H04N 5/38 |
| 2021/0160453 A1* | 5/2021 | Vaid | H04N 7/102 |

FOREIGN PATENT DOCUMENTS

| | | |
|---|---|---|
| JP | 2017169048 A | 9/2017 |
| JP | 2018005434 A | 1/2018 |
| WO | 2017179295 A1 | 10/2017 |

OTHER PUBLICATIONS

German Search Report dated Dec. 19, 2018 for corresponding German Patent Application No. 10 2018 203 969.0.

Office Action dated Feb. 19, 2023 from corresponding Chinese patent application No. 201980018966.9.

Notice of Reasons for Refusal dated Jan. 4, 2023 from corresponding Japanese patent application No. 2020-543754.

Notice of Reasons for Refusal dated Jan. 4, 2023 from corresponding Japanese patent application No. 2020-543754 (Translated).

Decision to Grant dated Aug. 2, 2023 from corresponding Japanese patent application No. 2020-543754.

* cited by examiner

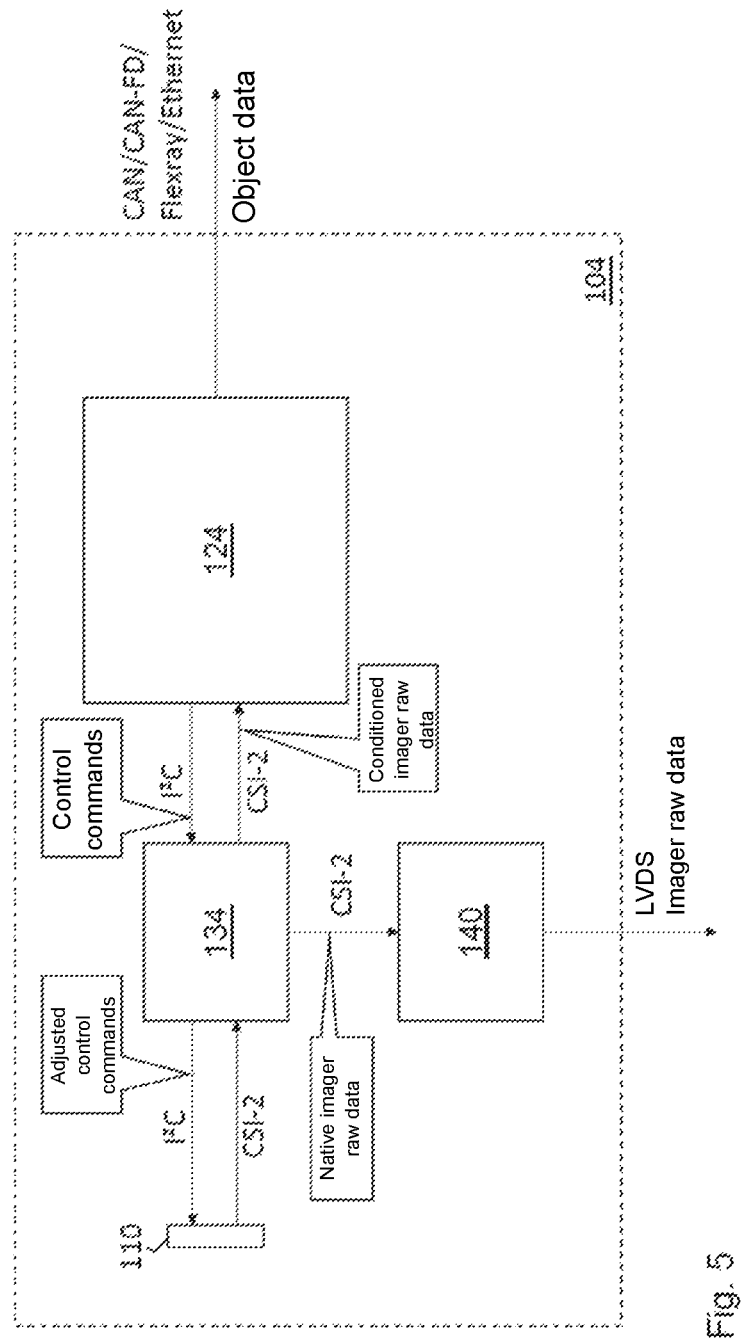

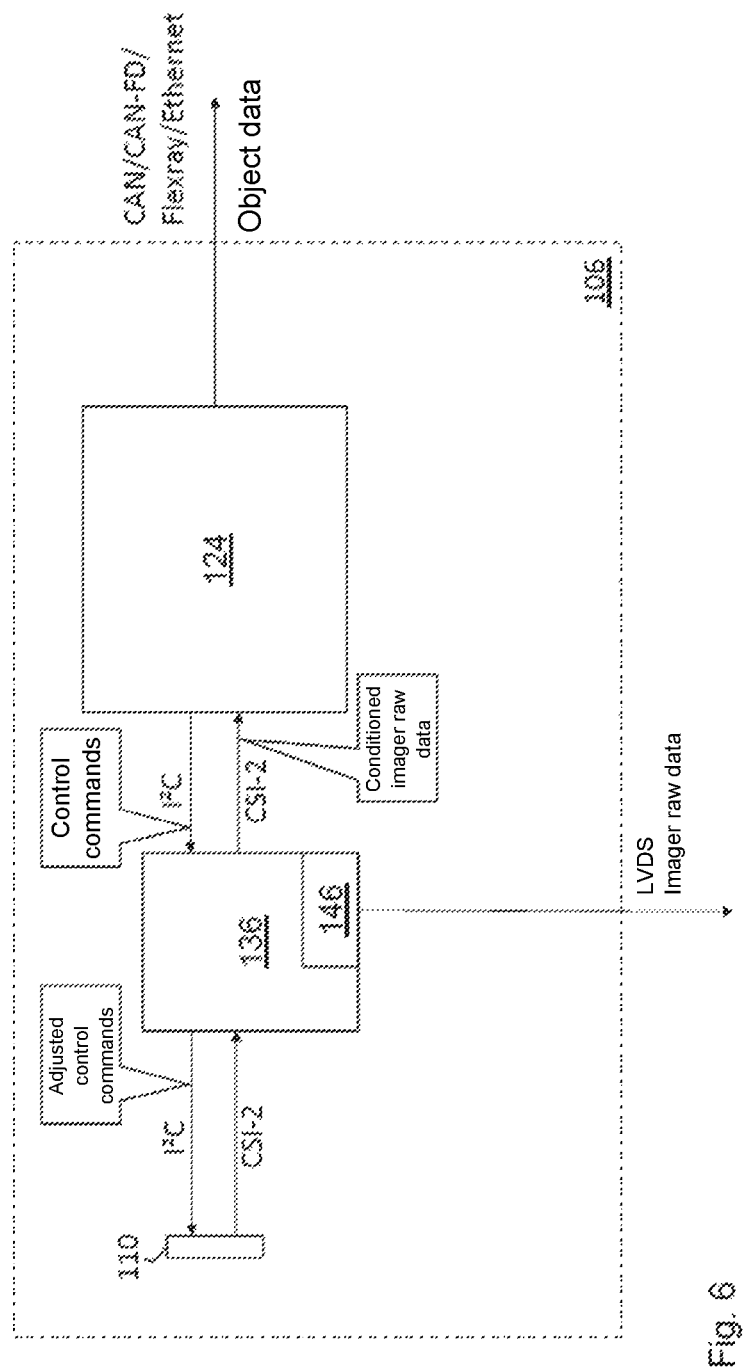

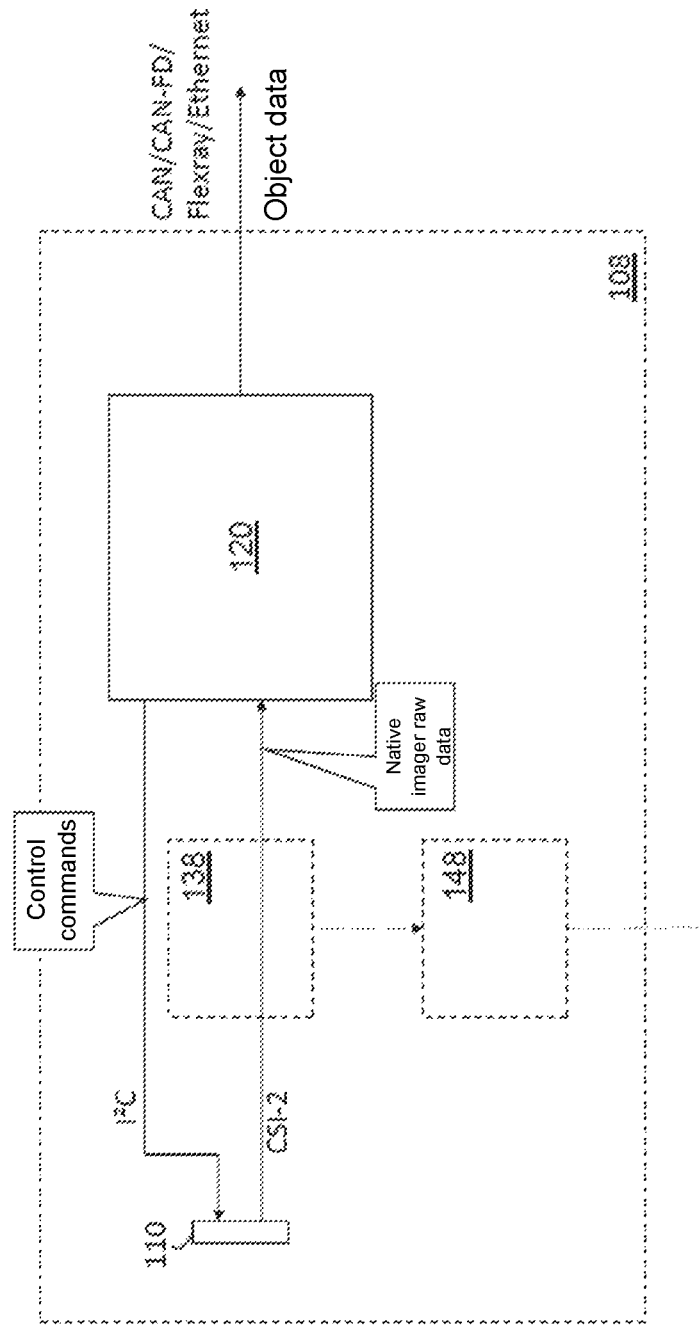

AUTOMOBILE CAMERA COMPRISING RAW IMAGE SIGNAL INTERFACE

CROSS REFERENCE TO RELATED APPLICATION

This application is a continuation of International application No. PCT/DE2019/200022, filed Mar. 13, 2019, which claims priority to German Application No. DE 10 2018 203 969.0, filed Mar. 15, 2018, each of which is hereby incorporated by reference.

TECHNICAL FIELD

The technical field relates generally relates to a camera system which can be used as a sensor system for driver assistance systems and automated driving

BACKGROUND

Camera systems having camera heads without their own image processing, which supply a raw image data stream to a controller (ECU), are known. The external or central controller carries out the processing of the raw image data. Panoramic view camera systems which are already available work in accordance with this principle.

Intelligent cameras having their own image processing, in which the raw image data stream only occurs internally but is not made available to an external interface, are alternatively known. Data obtained from the image processing, e.g., regarding objects, are output here.

Within the framework of solutions for systems for automatic driving, concepts of redundancy are currently being considered in which image processing takes place in parallel at multiple locations. This results in significant hardware expenditure and the costs associated therewith. At the same time, the automated driving (AD) systems should also recycle equipment from assisted driving systems (ADAS) as much as possible, since the market share of these solutions will also be substantially higher in the coming years than for AD systems. It is estimated that only approx. 10-20% of such camera systems will be AD systems in 2025. For the first AD systems on the market in 2020, these synergies do not exist or are only very low. For subsequent solutions (as of 2021) costs must be optimized accordingly—inter alia by jointly validating the image processing functions for ADAS and AD.

As such, it is desirable to present an intelligent camera which can be deployed both for ADAS and for AD. In addition, other desirable features and characteristics will become apparent from the subsequent summary and detailed description, and the appended claims, taken in conjunction with the accompanying drawings and this background.

BRIEF SUMMARY

A starting point of the solution is that the intelligent camera is designed in such a manner that it is an integral part of a concept of redundancy in that it can process the raw image data internally, but can also output raw image data so that this data can be processed at another location.

In one embodiment, a camera device includes an image sensor (image acquisition sensor, imager), an integrated processor, e.g., a SoC (system on chip), and an output interface, e.g., an LVDS (low voltage differential signal) interface. The camera device is suitable for use in a vehicle as an integral part of a sensor system for driver assistance systems and (or respectively or) automated driving. The camera device comprises a splitter (signal splitter) which reads in raw image signals (or respectively raw image data, raw data or image raw data) from the image sensor and then provides this data to both the integrated processor and to the output interface for transmission to an external processor. The integrated processor is designed (or respectively configured) to determine first object data by processing the raw image signals provided. The camera device is preferably a front camera, that is to say a forward-looking vehicle camera, arranged in the vehicle.

Advantages lie in allowing simplified concepts of redundancy in the field of automated driving, which simultaneously synergize with driver assistance systems, and therefore lower the costs.

At the same time, the proposed solution makes it possible for the image-processing SoC of such an intelligent camera to not be burdened with extracting the raw image data. Otherwise, the required bandwidth for the external memory of the SoC, in particular, would usually be excessively burdened, which would result in a decrease in performance during the image processing or, in extreme cases, would not be possible at all, since the maximum memory bandwidth would not be sufficient for image processing and extracting the image raw data.

According to one configuration, the image sensor outputs its raw image signals utilizing a point-to-point connection (in particular CSI-2). The integrated processor reads in the raw image signals by means of a point-to-point connection. The splitter is a point-to-point connection splitter in the data path between the image sensor and the integrated processor. CSI-2 is a standard for a serial connection, which only permits a point-to-point connection, that is to say only between two partners (in contrast to a bus system). The official designation is "MIPI Camera Serial Interface 2" of the MIPI Alliance (MIPI=Mobile Industry Processor Interface). When using CSI-2, the splitter is a CSI-2 splitter.

The splitter transmits the raw image signals to a serializer which converts the raw image signals into serial signals and provides these signals to the external output interface. In particular, the serializer converts data in the format and also electrically from CSI-2 to a two-conductor LVDS connection.

In an advantageous configuration, the serializer is integrated into the splitter.

The external output interface may be configured in such a manner that the raw image signals are output as LVDS. A serializer which might possibly be present is specific to the external output interface. GMSL (Gigabit multimedia serial link; Maxim Integrated) or FPD-Link II (TI) can, for example, be used as the external output interface. LVDS relates to the physical transfer layer and is applicable to both interface "formats".

The integrated processor may transfer control commands for controlling the image sensor utilizing an I2C data bus directly to the image sensor. I2C (Inter-Integrated Circuit) is a serial bus system having relatively low transfer speeds, in order to join e.g. modules such as an A/D-converter, EEPROM etc. to a microcontroller (µC) or a system on chip (SoC). A host adapter can respond to all of the other subscribers or receive data from them.

The splitter is advantageously designed to condition the raw image signals, and to transmit conditioned raw data to the integrated processor. A form of conditioning can, e.g., consist of performing a binning of pixels of the image sensor. The combining of neighboring pixels into larger units is called binning, e.g., two horizontally neighboring pixels can in each case be combined into a wide pixel or two vertically neighboring pixels can in each case be combined into a high pixel. Binning reduces the resolution with respect to the image having maximum resolution (unbinned image), as a result of which it can be further processed more quickly. A 2×2 binning, in which four neighboring pixels forming a pixel square are combined is advantageous; accordingly, a 3×3 binning, in which nine pixels are combined, etc. is moreover possible.

In this case, the splitter may be designed to transmit native, i.e., unconditioned, raw image signals to the output interface and/or the serializer.

According to an advantageous further development, the integrated processor can transmit control commands for controlling the image sensor to the splitter, and the splitter can be designed to adjust the control commands and to transmit the adjusted control commands to the image sensor. For example, the SoC can demand of the imager that it works in a binned mode. However, the splitter adjusts said control command in such a manner that it informs the imager that it should work in an unbinned manner, since the splitter is intended to transmit the high resolution of the imager to the serializer. The splitter then assumes the binning for the output to the SoC and transmits conditioned (binned) raw data to the SoC.

Also disclosed is a plurality of assembly variants of a basic design in order to produce the camera devices in a cost-effective manner, which includes at least one group of camera devices as described above, and another group of camera devices without a splitter and without an output interface. Cost-optimized assembly options of printed circuit boards of the camera devices may be provided such that a majority of the (expensive) components of the camera can be utilized in an unchanged form in all variants. Depending on the assembly option, the splitter and output interface are soldered as additional components onto the unchanged printed circuit board.

A vehicle-mounted sensor system for driver assistance systems and automated driving is also disclosed, wherein the sensor system comprises at least one camera device according to the invention and the external processor.

The external processor of the vehicle-mounted sensor system may be designed to determine second object data by processing the raw image signals provided by the output interface of the camera device.

BRIEF DESCRIPTION OF THE DRAWINGS

Embodiments and further aspects as well as figures are explained in greater detail below, wherein:

FIG. 5 shows a solution in a third variant of an intelligent camera;

FIG. 6 shows a solution in a fourth variant of an intelligent camera; and

FIG. 7 shows an intelligent camera in an assembly option without a raw data output.

DETAILED DESCRIPTION

Figure 1:
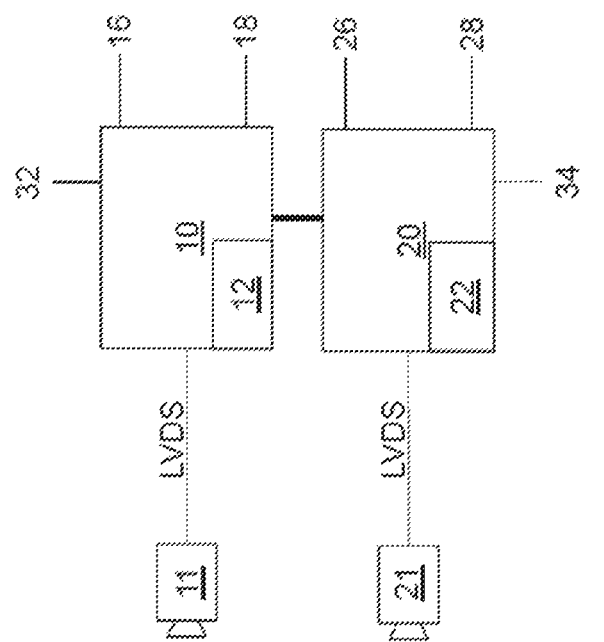
FIG. 1 shows a concept of redundancy for automated driving without using an intelligent camera in accordance with the prior art.

FIG. 1 schematically shows a "traditional" concept of redundancy for AD which does not use an intelligent camera.

A first forward-facing camera head 11 transmits the captured image data as raw data via LVDS to a first controller 10 which comprises a first image processor 12. The first controller 10 is electrically connected to a first power supply 16 and outputs data by means of a first vehicle interface 18 in order to continue controlling the vehicle. First additional sensors 32 can supply data to the first controller 10.

A second forward-facing camera head 21 is connected by means of LVDS to a second controller 20 which comprises a second image processor. The second controller 20 is electrically connected to a second power supply 26 and outputs data by means of a second vehicle interface 28 in order to continue controlling the vehicle. Second additional sensors 34 can supply data to the second controller 20. The first and second controllers 10, 20 are consequently redundant, but all of the components are required in duplicate.

Figure 2:
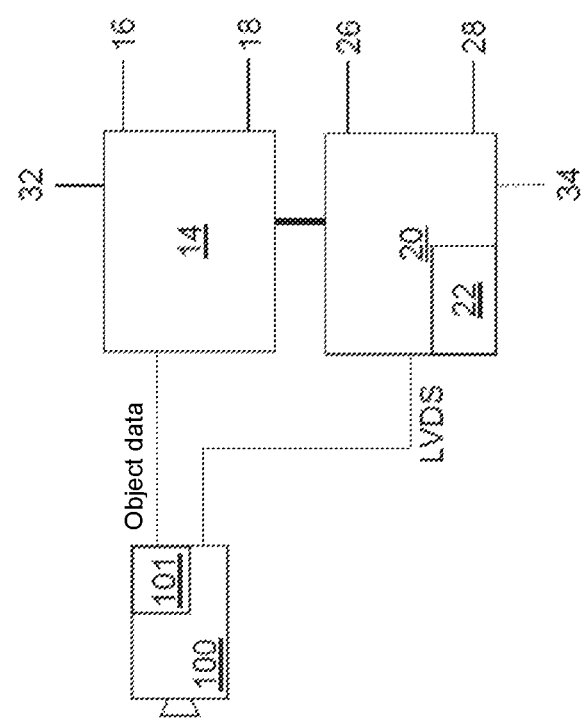
FIG. 2 shows a novel concept of redundancy for automated driving.

An alternative concept of redundancy for AD is schematically depicted in FIG. 2. As in FIG. 1, there is a second controller 20 having an integrated image processor 22, LVDS input, second power supply 26, second vehicle interface 28 and a connection to second additional sensors 34. The difference from the "traditional" concept of redundancy now is that a forward-facing intelligent camera 100 transmits raw image data via LVDS to the second controller 20 and, in addition, in an integrated image processor (101), e.g. on the SoC, determines object data by processing the raw image data. The determined object data are transmitted to a modified first controller 14 which does not have an image processor. The connections of the modified first controller 14 to the first power supply 16, first vehicle interface 18 and first additional sensors 32 are unchanged.

In order, in other words, to allow parallel image processing in the intelligent camera and in a second ECU (Electronic Control Unit), the intelligent camera supplies the raw data of its imager preferably in an unchanged manner by means of an external interface to said ECU. The external interface is preferably an LVDS interface.

However, since the interface of the imager with the processor in the intelligent camera is a point-to-point connection (CSI-2), the raw signal of the imager cannot be tapped simply. Instead, an intelligent hardware element (splitter or respectively "CSI2 splitter") is inserted into this connection, which reads in the raw signal from the imager, conditions it if necessary, and then makes it available to both the processor (SoC, system on chip) of the intelligent camera and a serializer for an external LVDS interface.

From the viewpoint of the SoC, this additional hardware element is transparent, i.e., it appears to the processor as if the imager were directly attached.

It will now be explained in greater detail how such an intelligent camera can be constructed, with reference to FIGS. 3 to 6.

Figure 3:
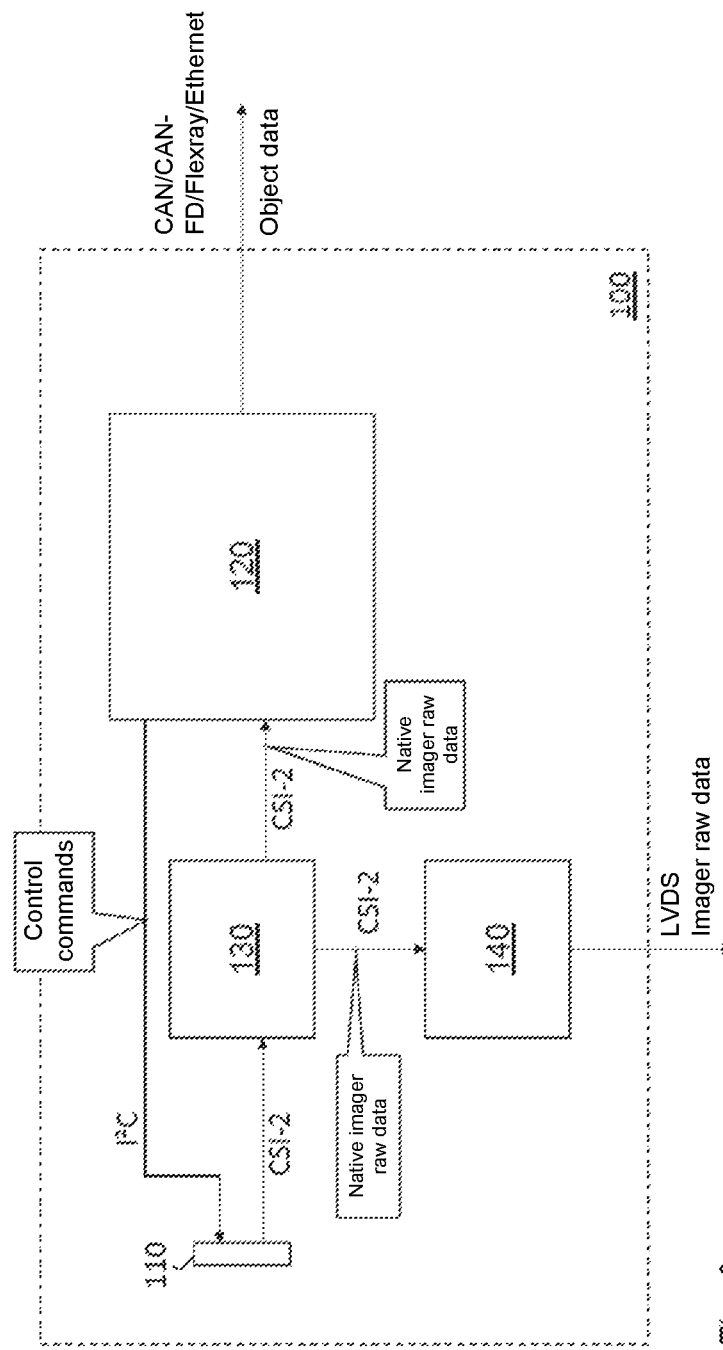
FIG. 3 shows a solution in a first variant of an intelligent camera.

FIG. 3 schematically shows a first exemplary embodiment of an intelligent camera 100. An image acquisition sensor (hereinafter imager) 110 captures image data and transmits this data as a raw signal by means of a point-to-point connection (CSI-2) to a splitter 130 ("CSI2 splitter") which reads in the raw signal from the imager 110 and then makes it available to both the integrated processor 120 (SoC, system on chip) and a serializer 140 as native imager raw data. The serializer outputs the imager raw data by means of an external LVDS interface. The integrated processor evaluates, on the one hand, the native imager raw data and determines object data which are output via CAN, CAN-FD, Flexray or Ethernet to the vehicle network. On the other hand, the integrated processor 120 or respectively the SoC sends control commands by means of an I2C data bus to the imager 110.

Figure 4:
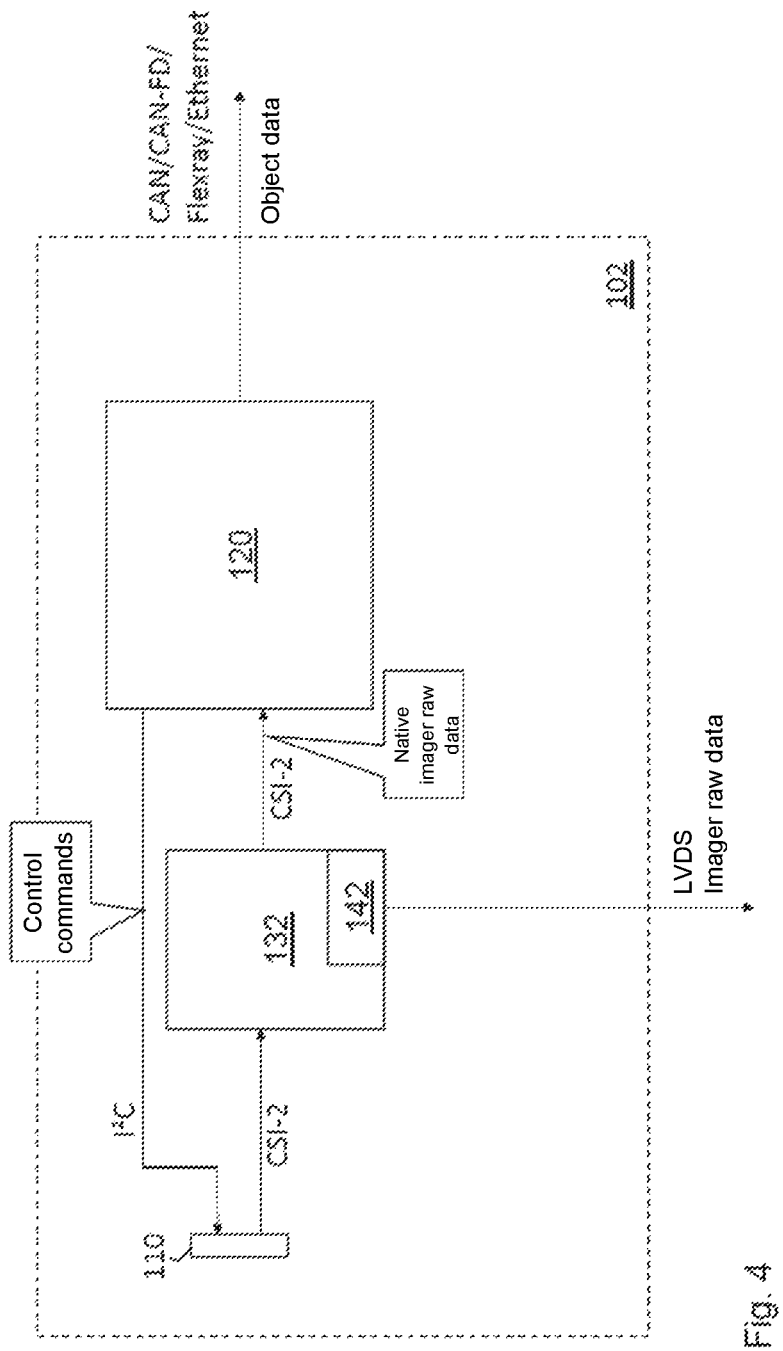
FIG. 4 shows a solution in a second variant of an intelligent camera.

FIG. 4 schematically shows a second exemplary embodiment of an intelligent camera 102. The difference from the first exemplary embodiment is that, in this case, the serializer 142 is integrated into the splitter 132 such that the splitter 132 outputs the imager raw data directly by means of LVDS.

FIG. 5 schematically shows a third exemplary embodiment of an intelligent camera 104. The difference from the first exemplary embodiment is that the splitter 134 conditions the raw data and relays conditioned imager raw data to a varied integrated processor 124 via CSI-2. This varied integrated processor 124 evaluates the processed imager raw data and determines object data which are output via CAN, CAN-FD, Flexray or Ethernet to the vehicle network. On the other hand, the varied integrated processor 124 sends control commands by means of an I2C data bus to the splitter 134. The splitter 134 adjusts the control commands and transmits correspondingly adjusted control commands by means of an I2C data bus to the imager 110.

In some cases, the processing capacity of the SoC in the intelligent camera is lower than that in the external ECU which is joined in parallel (in terms of the concept according to FIG. 2). In particular, in the case of high-resolution imagers, it can therefore be necessary that the raw image data stream of the imager has to be processed as well by the "CSI2 splitter" for the SoC of the intelligent camera (i.e. e.g. reduced in terms of resolution or in terms of image detail or frame rate), whilst it is forwarded in an unchanged manner to the external interface.

FIG. 6 schematically shows an exemplary embodiment of a fourth intelligent camera 106. The difference from the third exemplary embodiment is that, in this case, the serializer 146 is integrated into the splitter 136 such that the splitter 136 outputs the imager raw data by means of LVDS.

FIG. 7 shows an assembly variant of an intelligent camera 108 without a raw data output. In this case, an intelligent hardware element 138 and serializer 148 (dashed boxes) are omitted. Said assembly variant makes possible an inexpensive joint production of the variants with and without a raw data output.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A camera device for use in a vehicle as an integral part of a sensor system for driver assistance systems and automated driving, comprising an image sensor, an integrated processor, and an output interface, wherein the camera device comprises a splitter which reads in raw image signals from the image sensor and then provides this data to both the integrated processor and to the output interface for transmission to an external processor, wherein the integrated processor determines first object data regarding a first object proximate to the vehicle and present in the raw image signals by processing the raw image signals provided;
wherein the splitter transmits the raw image signals to a serializer which converts the raw image signals into serial signals and provides these signals to the output interface.

2. The camera device according to claim 1, wherein the image sensor outputs the raw image signals with a point-to-point connection, the integrated processor reads in raw data with a point-to-point connection, and the splitter is a point-to-point connection splitter in the data path between the image sensor and the integrated processor.

3. The camera device according to claim 1, wherein the serializer is integrated into the splitter.

4. The camera device according to claim 1, wherein the output interface is designed in such a manner that the raw image signals are output as low-voltage differential signaling ("LVDS").

5. The camera device according to claim 1, wherein the integrated processor transfers control commands for controlling the image sensor with an $I^2C$ data bus directly to the image sensor.

6. The camera device according to claim 1, wherein the splitter is designed to condition the raw image signals and to transmit conditioned raw image signals to the integrated processor.

7. The camera device according to claim 6, wherein the splitter is designed to transmit native raw image signals to the output interface and/or the serializer.

8. The camera device according to claim 6, wherein the integrated processor transmits control commands for controlling the image sensor with an I²C data bus to the splitter, and the splitter is designed to adjust these control commands and to transmit the adjusted control commands to the image sensor with an I²C data bus.

9. A sensor system for driver assistance systems and automated driving of a vehicle, comprising:
a camera device having an image sensor, an integrated processor, and an output interface;
an external processor external from the camera device;
wherein the camera device further includes a splitter which reads in raw image signals from the image sensor and then provides this data to both the integrated processor and to the output interface for transmission to the external processor; and
wherein the integrated processor is designed to determine first object data regarding a first object proximate to the vehicle and present in the raw image signals by processing the raw image signals provided;
wherein the splitter transmits the raw image signals to a serializer which converts the raw image signals into serial signals and provides these signals to the output interface.

10. The sensor system according to claim 9, wherein the external processor is designed to determine second object data regarding a second object proximate to the vehicle by processing the raw image signals provided by the output interface of the camera device.

11. The sensor system according to claim 9, wherein the image sensor outputs the raw image signals with a point-to-point connection, the integrated processor reads in raw data with a point-to-point connection, and the splitter is a point-to-point connection splitter in the data path between the image sensor and the integrated processor.

12. The sensor system according to claim 9, wherein the serializer is integrated into the splitter.

13. The sensor system according to claim 9, further comprising at least one separate camera device without a splitter and without an external output interface.

* * * * *